(12) United States Patent
Kazazian

(10) Patent No.: US 6,494,107 B1
(45) Date of Patent: Dec. 17, 2002

(54) DEVICE FOR VISUAL DISPLAY OF THE FLOW RATE AND THE TEMPERATURE OF A FLUID

(75) Inventor: Thierry Kazazian, Paris (FR)

(73) Assignee: Enviro Developpement, Chatellerault (FR)

( * ) Notice: Subject to any disclaimer, the term of this patent is extended or adjusted under 35 U.S.C. 154(b) by 0 days.

(21) Appl. No.: 09/831,890
(22) PCT Filed: Aug. 14, 2000
(86) PCT No.: PCT/FR00/02321
§ 371 (c)(1), (2), (4) Date: May 23, 2001
(87) PCT Pub. No.: WO01/22096
PCT Pub. Date: Mar. 29, 2001

(30) Foreign Application Priority Data

Sep. 23, 1999 (FR) .................................. 99 11922

(51) Int. Cl.[7] ................................................. G01F 1/05
(52) U.S. Cl. ..................................................... 73/861.79
(58) Field of Search ......................... 73/861.79, 861.58, 73/861.55; 210/94; 374/147

(56) References Cited

U.S. PATENT DOCUMENTS

| 4,773,767 A | * | 9/1988 | Coll ........................... 374/147 |
| 5,171,429 A | * | 12/1992 | Yasuo ......................... 210/94 |
| 5,343,763 A | * | 9/1994 | Nielsen et al. ........... 73/861.58 |
| 5,806,528 A | * | 9/1998 | Magliochetti ............... 128/897 |

FOREIGN PATENT DOCUMENTS

| DE | 296 11 332 | 10/1996 |
| EP | 0 446 365 | 9/1991 |
| GB | 2 267 969 | 12/1993 |
| NL | 1005957 | 11/1998 |

* cited by examiner

Primary Examiner—Benjamin R. Fuller
Assistant Examiner—Jewel V. Thompson
(74) Attorney, Agent, or Firm—Jacobson Holman PLLC

(57) ABSTRACT

The invention concerns a device (1) designed to be fixed at the outlet of a tube (2) or pipe delivering a fluid, characterized in that it comprises means for displaying the flow rate and means for displaying the outlet temperature of said fluid.

6 Claims, 1 Drawing Sheet

DEVICE FOR VISUAL DISPLAY OF THE FLOW RATE AND THE TEMPERATURE OF A FLUID

This application is a national phase under 35 USC §371 of PCT International Application No. PCT/FR00/02321 which has an International Filing Date of Aug. 14, 2000, which designated the United States of America and was published in French and claims priority from 99-11922 filed Sep. 23, 1999, in France which is claimed herein.

The present invention relates to a device adapted to be fixed at the outlet of a tube or a flexible pipe making it possible to display the flow rate of a fluid, in particular water, as well as its temperature at the outlet of the tube or pipe.

Drinking water resources on the planet are not inexhaustible and one of the major stakes in years to come will be the control of the consumption of water.

Access to water resources is easy and the consumers, particularly in industrialized countries, are not very inclined to survey their consumption.

However, it is difficult to master one's water consumption when one does not know exactly what one is consuming.

Another drawback of such easy access to water are the risks of domestic accidents.

In effect, a large number of such domestic accidents, in particular involving children, come from burns caused by a water temperature which is much too high.

The generalization of devices of mixer faucet type has only amplified the phenomenon, the physical separation of the hot water and cold water supplies having disappeared.

Like the consumption of water that the consumer can master only with difficulty, without validly knowing the flow rate, the temperature cannot be efficiently monitored if this same consumer cannot reliably assess it, without having to place his/her finger or hand under the water jet.

In this context, the present invention proposes a device making it possible to assess the flow rate as well as the temperature of a fluid, for example water, at the outlet of a tube or a pipe, in order to control the consumption of this fluid and to avoid domestic accidents.

To that end, according to the invention, the device designed to be fixed at the outlet of a tube or a pipe delivering a fluid is characterized in that it comprises means for displaying the flow rate and means for displaying the outlet temperature of said fluid.

The means for displaying the flow rate and the means for displaying the temperature are advantageously constituted by the same element and comprise a propeller.

The means for displaying the temperature are preferably made from a material reacting to the variations in temperature.

According to a preferred form of embodiment, the means for displaying the flow rate and the temperature of the fluid are located in the axis of outlet of the fluid and the device comprises a substantially cylindrical body adapted to receive the means for displaying the flow rate and the temperature of the fluid.

In order to allow visual display, the body presents a transparent display window or, preferably, is totally transparent.

In addition, the device advantageously comprises means for filtration, for treatment of the fluid or reagents to the pollutants contained in this fluid.

The invention will be more readily understood in the light of the following description relating to an illustrative but non-limiting example embodiment, with reference to the accompanying drawings, in which:

FIG. 1 shows a first form of embodiment of the device 1 of the invention, connected to a water supply tube 2 of conventional form, itself connected to a mixer faucet or to one or more faucets as well as to a source of water (not shown).

Figure 1:
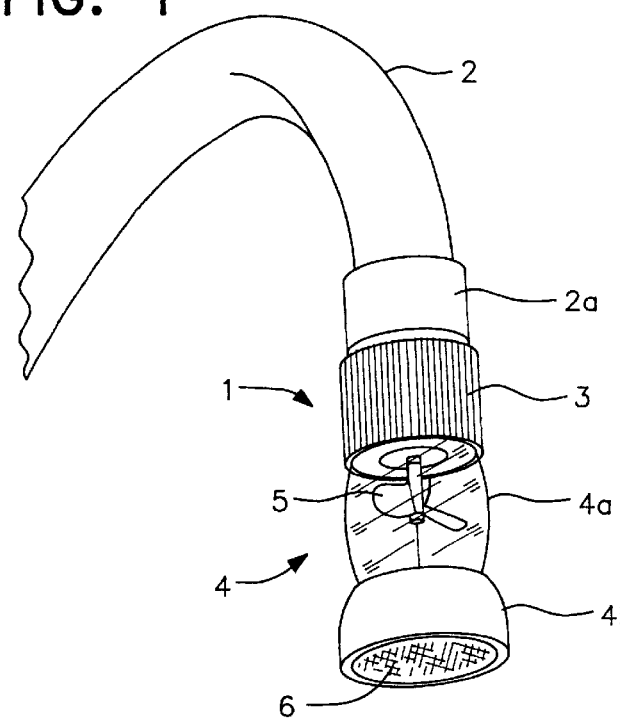
FIG. 1 is a view of the device of the invention in accordance with a first form of embodiment connected to a supply tube.

The terms "proximal" and "distal" are understood with respect to the direction of flow.

The device 1, of substantially cylindrical general shape, comprises a substantially cylindrical ring 3 making it possible to fix the assembly of the device 1 to the end 2a of the tube 2, in its extension. This ring 3 will be described in greater detail with reference to FIG. 2.

The device 1 also comprises a body 4, connected to the ring 3 in its extension, and composed of a proximal part 4a and of a distal part 4b.

The proximal part 4a, of substantially cylindrical shape and slightly convex, is adapted to receive, in the enclosure that it defines, a propeller 5 whose axis of rotation is colinear with respect to the axis of flow.

The propeller 5 presents any shape enabling it to be driven in rotation by the flow of the fluid through the device 1 and in particular through the body 4.

The proximal part 4a is made of a transparent material in order that the consumer can permanently see the propeller 5 placed inside.

The distal part 4b of the body 4 presents a substantially cylindrical shape, slightly widened in the direction of flow, and presents a cavity 6 inside which various accessories can be introduced, such as pellets or filters incorporating active charcoal, or any other member adapted to treat the water or to indicate the pollutant content thereof.

Figure 2:
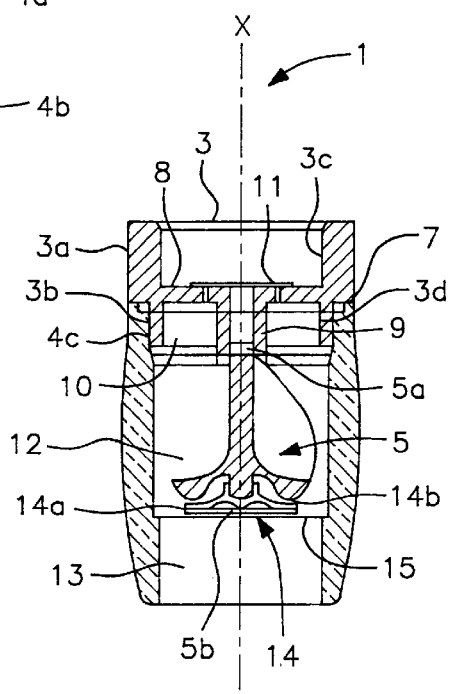
FIG. 2 is a side view in section of the device in accordance with a second form of embodiment.

FIG. 2 shows in section another form of embodiment of the device 1 which differs from that of FIG. 1, particularly by the shape of the body 4 and of the propeller 5.

The ring 3 for fixing the device 1 at the end 2a of the supply tube 2 is found again, bearing the same reference as the ring of FIG. 1, as both present functional resemblances.

This ring 3 presents a substantially annular general shape with axis X colinear with respect to the axis of flow of the fluid at the outlet of the end 2a of the tube 2.

The outer surface of the ring 3 is in two parts, separated by a shoulder 7, a proximal outer part 3a and a distal outer part 3b.

In the same way, the inner bore of the ring 3 is divided into two parts, separated by a radial return forming a crown 8, a proximal inner part 3c and a distal inner part 3d.

The ring 3 is fixed to the end 2a of the tube 2 by any known means such as a thread on one of the proximal parts of the ring 3, either outer 3a or inner 3c, or by force fitting.

The crown 8 comprises a central tubular part 9 with axis colinear with respect to axis X.

This central tubular part 9 defines with the distal inner part 3d an annular chamber 10. The length of the central tubular part 9 along axis X is, in the form of embodiment of FIG. 2, substantially equal to the length of the distal inner part 3d of the ring 3, but may be of different length in other forms of embodiment.

A plurality of bores 11, uniformly distributed in a circle on the crown 8, allow the passage of the fluid through the radial return 8 up to the annular chamber 10, delivering a calibrated flow rate called "flow rate Z", adapted to allow savings in fluid.

The distal outer part 3b of the ring 3 presents an outer thread on which is screwed the body 4 of the device 1 thanks to a corresponding inner thread 4c.

The body 4, which is substantially cylindrical, slightly convex and transparent over the whole of its length in the direction of axis X, presents two inner cavities 12 and 13 which are likewise substantially cylindrical.

Like the cavity 6 of the embodiment of FIG. 1, the cavity 13 may receive any type of member designed to improve the quality of the water, such as a filtering cartridge or reagents to the different classical pollutants of water.

A propeller 5, with axis colinear to axis X, is mounted to rotate inside the cavity 12 between two bearings, an upper bearing constituted by the central tubular part 9 of the crown 8 and a lower bearing 14 resting on a shoulder 15 separating the cavities 12, 13.

The lower bearing 14 comprises an annular part 14a, abutting on the shoulder 15, connected to a tubular central part 14b, with axis colinear to axis X.

The tubular central part 14b of the lower bearing 14 receives the distal end 5b of the axis of the helix 5, while the proximal end 5a is inserted in central tubular part 9 of the crown 8.

In order to ensure a perfect seal of the device 1, O-rings (not shown) are provided at the level of the joins between the ring 3 and the end 2a of the tube 2, as well as between the ring 3 and the body 4.

A first seal may be ideally placed at the end of the proximal inner part 3c of the ring 3, against the crown 8, and a second on the distal outer part 3b, against the shoulder 7.

Figure 3:
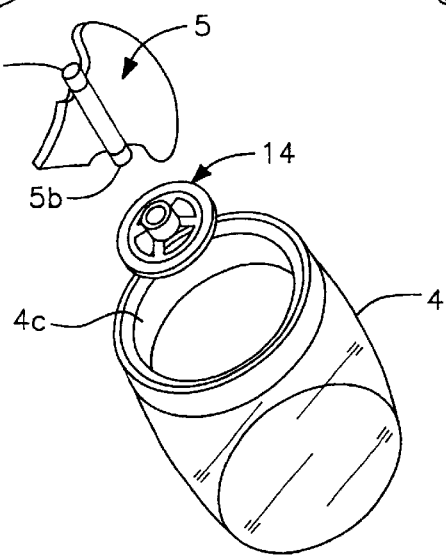
FIG. 3 is an exploded view in perspective of a variant of the device of FIG. 2.

FIG. 3 shows the device 1 of FIG. 2 in exploded perspective.

The proximal outer part 3a of the ring 3 is fluted in order to ensure a good grip in the hand when fixing the end 2a of the tube 2 and a screen 16 is disposed against the crown 8, centred on the tubular part 9.

The transparent body 4 is fixed on the ring 3 via an inner thread 4c.

The propeller 5 is mounted to rotate between the tubular part 9 of the crown 8 and the lower bearing 14 disposed in abutment on the shoulder 15 of the body 4 (FIG. 2).

The propeller 5 presents a particular blade shape allowing it to enter into rotation when the fluid (water for example) flows through the device 1.

The speed of rotation of the propeller therefore varies as a function of the importance of the flow rate of water.

Thus, thanks to the transparency of the body 4, the consumer has available at any moment reliable information on his/her consumption, directly connected with the flow rate of water and therefore with the speed of rotation of the propeller 5.

According to another aspect of the invention, the device comprises means for displaying the temperature of the water.

These means are advantageously integrated in the propeller 5, made of a material reacting to the temperature by change of shade.

Such change in the shade depending on the temperature (called thermochromism) is effected thanks to known processes such as the application of micro capsules of dyes of defined size and dispersion on the propeller 5.

In this way, at the same time as surveying or taking cognizance of his/her water consumption, thanks to the speed of rotation of the propeller 5, the consumer can assess the outlet temperature of the water thanks to the shade of said propeller 5.

The consumer thus avoids the risks of burns since he/she does not need to touch the jet of water to have an idea of its temperature.

In addition, the body 4 may receive in its cavity 13 (FIG. 2), reagents to different pollutants whose shade varies as a function of the content of these pollutants in the water.

Thus, depending on the shade of the reagents, the consumer is informed of the quality of the water, while the speed and the shade of the propeller 5 informs him/her on its flow rate and its temperature.

It should be noted that the device 1 may be fitted to any existing 5 conventional tube 2 or pipe.

What is claimed is:

1. Device to be inserted at an outlet of a tube or a pipe delivering a fluid, comprising means for displaying a flow rate and means for displaying the outlet temperature of said fluid, said flow rate and temperature display means being constituted by same element, said temperature and flow rate display means comprise a propeller and said propeller being made from a material reacting to variations in temperature.

2. Device according to claim 1, wherein the means for displaying the flow rate and the temperature of the fluid are located in the outlet axis of the fluid.

3. Device according to claim 1, further comprising a substantially cylindrical body adapted to receive the means for displaying the flow rate and the temperature of the fluid.

4. Device according to claim 3, wherein the cylindrical body presents a transparent display window.

5. Device according to claim 4, wherein the cylindrical body is totally transparent.

6. Device according to claim 4, further comprising means for filtration, for treatment of the fluid or reagents to pollutants contained in the fluid.

* * * * *